United States Patent [19]

Oswitch, deceased

[11] 4,431,752

[45] Feb. 14, 1984

[54] UNSATURATED POLYESTER FOAMS

[75] Inventor: Stanley Oswitch, deceased, late of Sarnia, Canada, by Pauline Oswitch, legal representative

[73] Assignee: Fiberglas Canada Inc., Sarnia, Canada

[21] Appl. No.: 440,047

[22] Filed: Nov. 8, 1982

[51] Int. Cl.$^3$ .............................................. C08J 9/06
[52] U.S. Cl. ...................................... 521/85; 521/96; 521/103; 521/182; 521/138
[58] Field of Search ................ 521/103, 138, 182, 85

[56] References Cited

U.S. PATENT DOCUMENTS

| | | | |
|---|---|---|---|
| 3,227,665 | 1/1966 | Fourcade et al. | 521/138 |
| 3,260,688 | 7/1966 | Watanabe et al. | 521/138 |
| 3,355,398 | 11/1967 | Kass | 54/103 |
| 3,393,260 | 7/1968 | Miler | 521/138 |
| 3,786,004 | 1/1974 | Furuya et al. | 521/138 |
| 3,855,160 | 12/1974 | Shiotsu et al. | 521/138 |
| 4,394,458 | 7/1983 | Wade | 54/85 |
| 4,397,948 | 8/1983 | Wade | 521/85 |
| 4,399,238 | 8/1983 | Wade | 521/85 |

*Primary Examiner*—Morton Foelak
*Attorney, Agent, or Firm*—Sughrue, Mion, Zinn, Macpeak & Seas

[57] ABSTRACT

Compositions for producing unsaturated polyester foams comprising sodium borohydride for curing the composition in conjunction with an organic peroxide catalyst, and for producing hydrogen gas as the foaming agent. The compositions which are simple and safe to prepare produce high quality foams.

14 Claims, No Drawings

UNSATURATED POLYESTER FOAMS

This invention relates broadly to unsaturated polyester foams.

Unsaturated polyester foams are starting to find wide and varied use. These foams are generally produced by curing and simultaneously expanding an unsaturated resin dissolved in a cross-linkable monomer. The curing is effected with a promoting agent in conjunction with a catalyst; and a blowing agent is used to produce gas which expands the polymer as it is being formed into a foam. Various auxiliary agents such as fire retardants can also be incorporated into the foams.

The quality of foam produced is dependent on the foam cell structure which in turn is dependent on the interaction of the polymerization process and the expansion of the cells by the evolved gas.

Surprisingly it has been discovered that the blowing agent sodium borohydride can also serve as a promoter or accelerator to the polymerization reaction.

According to an aspect of the present invention, there is provided a composition for producing an unsaturated polyester foam, the improvement comprising incorporating sodium borohydride into the composition as a promoter for curing the composition and as a foaming agent producing hydrogen gas.

Sodium borohydride ($NaBH_4$) on contact with water, alcohols, dilute acids and similar reagents reacts to liberate hydrogen gas ($H_2$) which is well suited for expanding and producing an unsaturated polyester foam. For example, one advantage of using $NaBH_4$ is that the reagents used and the products formed are essentially safe relative to, for example, isocyanate based chemicals often used in conventional unsaturated polyester foam production. A further safety advantage of the compositions described herein is that no acidic or corrosive reagents are used when sodium borohydride is used as the gas generator.

Besides acting as a source of $H_2$, $NaBH_4$ acts as a promotor or accelerator in conjunction with other agents used to cross-link the unsaturated polyester and the cross-linkable monomer; and in particular with the organic peroxide catalysts conventionally used in this art. This two-fold function of $NaBH_4$, i.e. curing and expanding the unsaturated polyester foam results in high quality foam of desirable properties for various uses. Without limiting the invention to any theoretical considerations it is believed that the simultaneous production of $H_2$, for expanding the foam, and curing of the unsaturated polyester by the $NaBH_4$ produces optimized foam cells, particularly when used in conjunction with decabromo-diphenyl oxide as described hereinafter which are reflected in the improved foam product. A possible, but not limiting, mechanism for the effect of the $NaBH_4$ is believed to be that: the $NaBH_4$ acts as a free radical initiator for the organic peroxide catalysts conventionally used to facilitate unsaturated polyester cure. As the reaction speeds up it seems that the bubbles of $H_2$ generated reach an optimum size just prior to the cure of the cell wall. In particular, no large blow holes or cavities are formed in the resultant foam.

As mentioned above, the use of $NaBH_4$ obviates the use of hazardous chemicals which are used in some conventional methods of unsaturated polyester foam production. A further advantage of the use of $NaBH_4$ as described herein is that readily available reagents can be used with standard production techniques.

In a preferred embodiment of this invention the $NaBH_4$ is used at a concentration of 2 to 8 parts per 100 parts of the unsaturated polyester resin; in general the minimum concentration of $NaBH_4$ which can be used to obtain practical results is 0.5 parts per 100 parts of the unsaturated polyester resin.

In a further preferred embodiment of the invention the unsaturated polyester used is a highly reactive one. For the purposes of this invention a highly reactive unsaturated polyester is defined to be one having an unsaturated to saturated acid ratio of greater than 3:1 and more preferably greater than 4:1. Using such highly reactive unsaturated polyesters a gel is obtained at ambient temperature in about three to six minutes.

The unsaturated polyester, cross-linkable monomer, promotor or accelerator (other than $NaBH_4$), catalyst and any auxiliary agent used in the compositions described herein are conventional. One particularly useful auxiliary additive is a microsphere normally ceramic which can produce a syntatic foam within the chemically expanded foam.

A mixed foaming agent can be used consisting of $NaBH_4$ and, for example, sodium bicarbonate ($NaHCO_3$). Under acidic conditions where $H_2$ is liberated from $NaBH_4$, carbon dioxide ($CO_2$) is liberated from $NaHCO_3$. The $H_2/CO_2$ gas mixture acts to expand the foam. Other reagents which produce $CO_2$ such as, for example, bicarbonates and carbonates other than that of sodium can, of course, also be used. When $NaHCO_3$ is used a preferred ratio of $NaBH_4:NaHCO_3$ is in the range from 1:5 to 1:10.

As an example, using the above defined 1:10, $NaBH_4$:$NaHCO_3$ mixed foaming agent, foams having an excellent appearance, at specific gravities of from 0.07 to 0.09 are readily produced and cure within 4 to 6 minutes at ambient temperature.

As mentioned previously, fire retardants are one of the auxiliary agents conventionally incorporated into unsaturated polyester foams. A particularly effective fire retardant for the foam compositions described herein is a combination of from about 10% to about 20% by weight of decabromodiphenyl oxide and about 4% by weight antimony trioxide. Typical self-extinguishing times for a foam incorporating the described fire retardant are from zero to five seconds. A further unexpected result has been observed; the incorporation, in the presence of low levels of antimony oxide, of a particulate fire retardant, for example, decabromodiphenyl-oxide in an amount of about 10% to about 30% by weight in the foam composition gives rise to improved cell formation and consistency of cell size as well as imparting self-extinguishing characteristics to the foam.

It has been found that the incorporation of aluminum trihydrate (ATH) in levels from 50–145 parts per 200 of polyester resin will significantly reduce the shrinkage of the foam on gellation. In addition the ATH will confer excellent fire retardancy properties on the foam as well as greatly reducing the smoke generated upon forced combustion of the foam. If ATH is used in the formulation the decabromo-diphenyl oxide is omitted. An optimum level for the ATH has been found to be 125 p.h.r.

A typical formulation would consist of:

| COMPONENT | PARTS BY WEIGHT |
| --- | --- |
| Unsaturated Polyester Resin | 100.000 |
| Aluminum Trihydrate | 125.000 |

-continued

| COMPONENT | PARTS BY WEIGHT |
| --- | --- |
| Methanol | 5.000 |
| Ceramic Microspheres | 4.250 |
| Antimony Trioxide | 2.000 |
| Surfactant | 4.000 |
| Benzoyl Peroxide (stabilized) | 2.500 |
| Dimethylaniline | 0.125 |
| Sodium Borohydride | 6.000 |

It should be noted, however, that the addition of iron based smoke suppressants inhibits the unsaturated polyester cure to an unacceptable degree and thus should be avoided.

The invention will now be described in further detail with reference to the following examples:

EXAMPLE 1

This example described typical components for producing an unsaturated polyester foam using $NaBH_4$ for the twin functions described earlier.

| COMPONENT | PARTS BY WEIGHT |
| --- | --- |
| Unsaturated polyester resin[1] | 100.000 |
| Brominated fire retardant additive[2] | 20.000 |
| Styrene monomer[3] | 7.500 |
| Methanol[4] | 5.000 |
| Glass hollow microspheres[5] | 4.250 |
| Antimony trioxide[6] | 4.000 |
| Surfactant[7] | 4.000 |
| $NaBH_4$ | 2.500 |
| Benzoyl peroxide[8] (stabilized) | 2.500 |
| Dimethylaniline[9] | 0.125 |

[1] for example, VIBRIN 572 a trademark of the F.C.I. Company
[2] for example, the previously mentioned decabromodiphenyl oxide.
[3] cross-linkable monomer
[4] reacts with $NaBH_4$ to produce $H_2$ according to: $NaBH_4 + 4CH_3OH \rightarrow NaB(OCH_3)_4 + 4H_2$
[5] other fillers can be substituted as required.
[6] acts in conjunction with fire retardant.
[7] for example, TWEEN (trademark).
[8] an example of an organic peroxide catalyst.
[9] an example of a secondary co-promoter to $NaBH_4$.

EXAMPLE 2

This example describes one possible method of combining the components noted in Example 1. Firstly, the unsaturated polyester resin, the fire retardant and the antimony trioxide are thoroughly mixed. Secondly, the surfactant, glass hollow microspheres, the styrene monomer, the dimethyl aniline and the methanol are blended into the unsaturated polyester resin mixture. Finally, the benzoyl peroxide would be added and just before foaming the $NaBH_4$ would be blended in. The mixing and blending processes can be effected by apparatus conventionally used in the art, for example, a high-speed, high-shear mixer.

It will be obvious to those skilled in the art that once all of the components or reactants, as described above, are mixed the previously described reactions of $H_2$ generation and curing of the resin will proceed without any further reaction initiating steps such as, for example, heating of the reaction mixture. Therefore, it follows that the reactants must only be mixed when a foam is to be produced. Accordingly, for the purposes of storage and transport at least some of the reactants must be kept separate. This requirement can be easily satisfied by preparing appropriate inert combinations of reactants and other components which can then be mixed when desired. Obviously, a system consisting of only two pre-mix constituents will be the simplest to use.

EXAMPLE 3

This example describes typical components for producing an unsaturated polyester foam using a combination $NaBH_4/NaHCO_3$ blowing agent.

| COMPONENT | PARTS BY WEIGHT |
| --- | --- |
| Unsaturated polyester resin[1] | 100.0 |
| Decabromodiphenyl oxide | 20.0 |
| $NaHCO_3$ | 10.0 |
| Antimony trioxide | 4.0 |
| Surfactant[7] | 4.0 |
| Benzoyl peroxide (paste) | 2.5 |
| 1:1 water/hydrochloric acid[10] | 1.6 |
| $NaBH_4$ | 1.0 |
| Dimethylaniline | 0.5 |
| Diethylaniline[11] | 0.2 |

[1,7] see Example 1.
[10] acidic environment required for liberation of $CO_2$ from $NaHCO_3$.
[11] an example of a further secondary co-promoter to $NaBH_4$.

The mixing procedures and the necessity to keep certain reactants apart until foam production is required are generally similar to the details given in Example 2.

EXAMPLE 4

This example shows some physical properties of a foam produced from a composition using a $NaBH_4/NaHCO_3$ mixture:

Morphology—rigid dimensionally stable foam
colour—pale tan
standard gravity—0.10–0.14
compressive strength (direction of rise)—55.6 p.s.i. at 10% deformation
compressive modulus (direction of rise)—$1.99 \times 10^4$ at 10% deformation
close cell content—approximately 10% shrinkage during polymerization—approximately 10% maximum.

In general the following data pertains to the foams described herein:
Open cell content, as measured with an air pyconometer—75–95%;
thermal conductivity—averages to 0.29 (Btu. in/ft$^2$/hr/°F.) for foams having a density of 5–7 pounds per cubic foot;

| Density (Pounds per cubic feet) | Mean Compressive Strength (in psi) |
| --- | --- |
| 5.4 | 33 |
| 6.9 | 63 |
| 7.5 | 68 |
| 8.3 | 94 |
| 9.9 | 105 |

The foams produced from the compositions described herein are particularly useful for structural plastics composites. However, the foams are also useful for insulation purposes.

The embodiments of the invention in which an exclusive property or privilege is claimed are defined as follows:

1. In a composition for producing an unsaturated polyester foam containing at least one of an unsaturated polyester, a cross-linkable monomer, a promoter, an accelerator, a catalyst and auxiliary agents, the improvement comprising:

incorporating sodium borohydride into said composition as a promoter for curing said composition and as a foaming agent producing hydrogen gas.

2. A composition for producing unsaturated polyester foam comprising:

an unsaturated polyester resin;

an organic peroxide catalyst; and sodium borohydride for curing said composition and as a foaming agent producing hydrogen gas.

3. A composition as defined in claim 2, further comprising:

a co-promoter for said sodium borohydride.

4. A composition as defined in claim 3, further comprising:

a cross-linkage monomer.

5. A composition as defined in claim 2, 3 or 4, wherein said sodium borohydride comprises from about 2 to about 8 parts per 100 parts of said unsaturated polyester resin.

6. A composition as defined in claim 2, 3 or 4, wherein said sodium borohydride comprises at least about 0.5 parts per 100 parts of said unsaturated polyester resin.

7. A composition as defined in claim 2, 3 or 4, wherein said sodium borohydride produces hydrogen gas by reacting with an agent selected from the group consisting of: water, an alcohol and a dilute acid, contained in said composition.

8. A composition as defined in claim 2, 3 or 4, wherein said organic peroxide catalyst is benzoyl peroxide.

9. A composition as defined in claim 4, wherein said co-promoter is selected from the group consisting of dimethylaniline and diethylaniline.

10. A composition as defined in claim 2, 3 or 4, further comprising from about 10 to about 30 percent by weight of decabromodiphenyl oxide and about 4 percent by weight of antimony trioxide.

11. A composition as defined in claim 2, 3 or 4, further comprising from about 10 to about 30 percent by weight of a particulate fire retardant including decabromodiphenyl oxide and low levels of antimony oxide.

12. A composition as defined in claim 2, 3 or 4, further comprising a blowing agent which produces carbon dioxide gas.

13. A composition as defined in claim 2, 3 or 4, further comprising sodium bicarbonate in a ratio of from 5:1 to 10:1 relative to said sodium borohydride.

14. A composition as defined in claim 2, 3 or 4, wherein said unsaturated polyester resin has an unsaturated to saturated acid ratio of greater than 3:1.

* * * * *